(12) United States Patent
Stone

(10) Patent No.: US 7,552,702 B2
(45) Date of Patent: Jun. 30, 2009

(54) WATER FUELED ENGINE

(76) Inventor: Charles L. Stone, P.O. Box 145, Clio, CA (US) 96106

( * ) Notice: Subject to any disclaimer, the term of this patent is extended or adjusted under 35 U.S.C. 154(b) by 113 days.

(21) Appl. No.: 11/944,333

(22) Filed: Nov. 21, 2007

(65) Prior Publication Data

US 2008/0127925 A1    Jun. 5, 2008

Related U.S. Application Data

(60) Provisional application No. 60/872,452, filed on Dec. 4, 2006.

(51) Int. Cl.
    *F02B 43/08* (2006.01)
(52) U.S. Cl. .................. 123/3; 123/536; 123/DIG. 12
(58) Field of Classification Search .............. 123/1 A, 123/3, 25 D, 25 B, 198 A, DIG. 12, 536, 123/543, 559.1, 527, 528; 60/275, 295, 303, 60/304, 761, 605.1
See application file for complete search history.

(56) References Cited

U.S. PATENT DOCUMENTS

| | | | |
|---|---|---|---|
| 5,177,952 A | 1/1993 | Stone | |
| 5,190,453 A | 3/1993 | Le et al. | |
| 6,257,175 B1 * | 7/2001 | Mosher et al. | 123/3 |
| 6,502,533 B1 * | 1/2003 | Meacham | 123/3 |
| 6,655,325 B1 * | 12/2003 | Botti et al. | 123/3 |
| 7,100,542 B2 * | 9/2006 | Ehresman | 123/3 |
| 7,143,722 B2 * | 12/2006 | Ross | 123/3 |
| 7,188,478 B2 * | 3/2007 | Bourgeois | 60/772 |
| 7,475,656 B2 * | 1/2009 | Yatsenko | 123/1 A |
| 2008/0087434 A1 * | 4/2008 | Wilen et al. | 166/312 |
| 2008/0141966 A1 * | 6/2008 | Morin et al. | 123/1 A |

* cited by examiner

*Primary Examiner*—Hai H Huynh

(57) ABSTRACT

A water fueled engine, which purifies, heats and cracks water into its constituent elements in gaseous form, stores the hydrogen and oxygen separately under pressure, feeds the hydrogen to a combustion engine where it is reacted in the presence of atmospheric air, transferring the heat generated from the reaction to a water heater and torque energy to a drive shaft; an after burner that further reacts the exhaust process of the combustion engine in the presence of more atmospheric air and oxygen from the cracking process, and a turbine that drives a battery connected alternator for powering a control unit for the system, which controls all system components to ensure on demand operation.

24 Claims, 1 Drawing Sheet

WATER FUELED ENGINE

CROSS-REFERENCE TO RELATED APPLICATION

Figure 1:
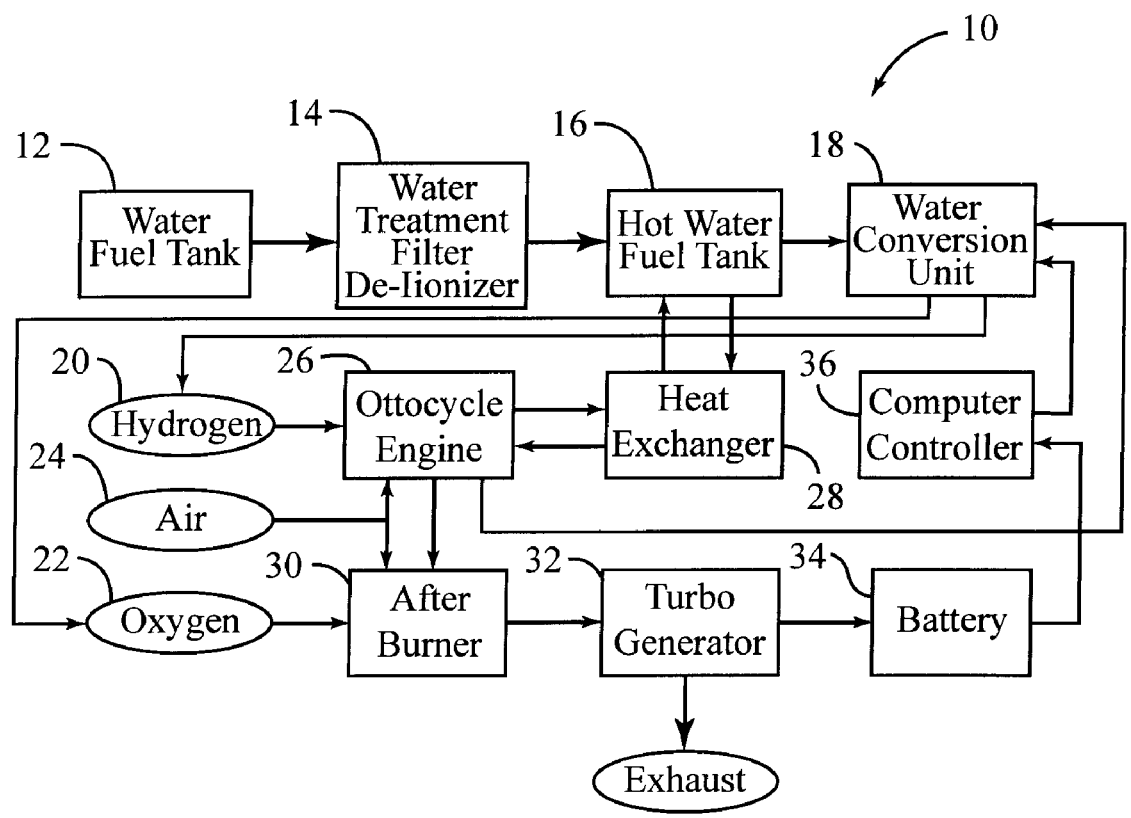

This application claims the benefit of the priority filing date of provisional application No. 60/872,452, filed on Dec. 4, 2006.

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

U.S. Pat. No. 5,177,952 to Stone discloses a closed cycle power system comprising a means for combusting a fuel and an oxidizer at stoichiometric conditions so that the resulting combustion products combine with a third product to form a working fluid. The third product has the same atomic and molecular constituents as the fuel and oxidizer. An engine is provided for receiving and deriving power from the working fluid. A controlled portion of the exhaust from the engine is cooled, extracted and condensed. Separating means are provided for separating the controlled portion into its original atomic constituents for storage under high pressure and reuse as fuel and oxidizer. The remaining portion of the exhaust becomes the third product which is combined with the combustion efflux to form a working fluid. The resulting stoichiometric closed loop process provides an efficient source of power.

U.S. Pat. No. 5,190,453 to Le et al discloses a staged combustor comprising a first combustion stage for combusting a fuel rich mixture of a fuel and an oxidizer, and a plurality of serially positioned secondary combustion stages downstream the first stage for receiving secondary flows of oxidizer to the increasing mass of combustion efflux. The gradual increase of oxidizer/fuel ratios provide a resultant substantially stoichiometric combustion. A cooling system is provided for cooling these combustion stages.

It is therefore an object of the present invention to provide a water fueled engine that separates water into hydrogen and oxygen, and uses the hydrogen as a fuel source for a combustion engine. It is a further object of the present invention to provide an engine that uses the waste heat from the first combustion process to encourage the separation of the water fuel, and oxygen from the separation process for additional combustion and energy generation. Finally it is an object of the present invention to provide a water fueled engine that creates the energy needed to govern the processes of a self contained water fueled engine, and which comprises the computer controls necessary for regulation of the engine.

SUMMARY

The present invention comprises a combustion engine using water as a fuel source and hydrogen combustion to provide energy from the engine; including energy to maintain ongoing hydrogen production from the fuel on an on demand basis.

The engine comprises; a first water fuel tank, a water treatment system, a second water fuel tank containing heated water, a water conversion unit for splitting water molecules into hydrogen and oxygen gasses, a hydrogen tank, an oxygen tank, an air intake, a combustion engine, a catalyzing afterburner utilizing atmospheric carbon as fuel, a turbine generator powering an alternator and battery, and a computer that controls the entire system.

Water enters the system from the water fuel tank, initially encountering the water treatment and filtration system, where it is conditioned, including de-ionized. The filtered, de-ionized water then enters the hot water tank where it is heated by hot water circulating between the hot water tank and a waste heat exchanger capturing engine heat. The heated water then travels into a water conversion unit where a cracking process, including electrolysis, catalysis, vacolysis, thermolysis and magnetolysis, or some combination thereof is applied to the water, converting it into its constituent elements; hydrogen and oxygen, in gaseous form. The hydrogen and oxygen gasses are directed into separate tanks where they are stored under pressure. Hydrogen gas travels from the hydrogen tank to a combustion unit, including an Otto cycle engine or similar combustion engine, where it is burned in the presence of atmospheric air from an air intake, resulting in power for driving a shaft. The exhaust products of this combustion are combined with more carbon containing atmospheric air and oxygen from the oxygen tank in a catalyzing afterburner where more combustion takes place. The combustion energy drives a turbine unit which powers an alternator and battery that electrically powers a computer control unit that controls the settings of the water converter to slow down or speed up the reaction process.

FIGURES

FIG. 1 is a schematic diagram of the principal elements of the water fueled engine of the present invention.

DESCRIPTION

Referring to FIG. 1, an improved water fueled engine is shown and described. The engine 10 comprises a first water fuel tank 12, which in one preferred embodiment is a 15 to 20 gallon tank made of polypropylene, or another type of plastic. A sensor disposed on the exterior of the tank senses the volume of water in the tank and transmits this information to the control means, including the vehicle's onboard computer to calculate the operational needs of the engine. Engine operations information is then displayed to the operator. A means to prevent water from freezing is also incorporated into the tank.

In addition to the first water fuel tank 12, a water treatment system 14, including a filter and de-ionizer, is disposed to receive water from the first water fuel tank 12. The treatment system 14 includes a filter, water de-ionizer, and water quality sensor. The water treatment system 14 is capable of treating enough water to supply the second (hot) water fuel tank 16.

Water passing through the treatment system 14 is received in the second water tank 16, which also serves as a reservoir for hot water, as water from the second tank 16 circulates through the heat exchanger 28 and back into the second water tank 16. In one preferred embodiment, a valve arrangement causes water from the treatment system 14 to bypass the second water tank 16, and instead causes it to travel through an electric heating means prior to entering the conversion unit 18. This is necessary at engine start up, and until the heat exchanger 28 is providing sufficiently hot water for the system.

The second water tank 16 feeds filtered water into the water conversion unit 18 for gasification. The water conversion unit 18 comprises a cracking means, including applying lowered atmospheric pressure, heat, magnetic fields, and electrical energy in any combination, including using any single means to weaken the molecular bonds of the fuel. It is intended that applying thermal, and pressure means will augment the normal electrolysis process, although it is possible that under certain conditions, electrolysis will not be necessary.

Water entering the conversion unit 18 is converted to hydrogen and oxygen gas. Hydrogen gas is moved to a hydrogen tank 20. In one preferred embodiment, the hydrogen tank 20 comprises a molded plastic tank capable of sustaining a pressure of 100 psi, and capable of holding enough hydrogen to respond to the demands of the primary combustion means 26. In another preferred embodiment, the hydrogen tank 20 holds enough hydrogen for the primary combustion means 26 to operate for at least two minutes. A means is also disposed in the engine to maintain the hydrogen tank 20 at a constant pressure, in one embodiment; 100 psi.

Oxygen from the conversion unit 18 is delivered to an oxygen tank 22. In one preferred embodiment, the oxygen tank 22 is capable of storing sufficient oxygen at a 100 psi charge to supply the secondary combustion means 30 and the turbine generating means 32.

An air intake 24 supplies atmospheric air into the first combustion means 26 and second combustion means 30.

The first combustion means 26 combusts a mix of atmospheric air from the air intake 24 and hydrogen from the hydrogen tank 20. The mechanism used by first combustion means 26 to combust hydrogen also creates heat and vacuum pressures used by the system. Heat is delivered to the heat exchanger 28, causing the temperature of the water circulated between the heat exchanger 28 and the second water tank 16 to rise. In one preferred embodiment, the heat exchanger 28 is incorporated into the combustion means 26 to increase efficiency.

After the first combustion, hydrogen exhaust gasses, including waste gasses, and atmospheric elements that have not reacted are transferred from the first combustion means 26 to the second combustion means 30. In one preferred embodiment, the second combustion means 30 comprises an after burner comprising catalyst material for reacting the hot exhaust gases from the first combustion means 26, oxygen from the oxygen tank 22 and atmospheric air containing carbon from the air intake 24.

Exhaust from the second combustion means is delivered to the turbine generating means 32. In one preferred embodiment, the turbine generating means is comprised of or associated with an alternator for generating electricity. In a further preferred embodiment, the turbine rotates at fewer than 100,000 rpm to power the alternator. A battery 34 is used for storing power generated by the alternator.

A computerized controller 36 manages the operations of the other components of the system: Specifically, the controller 36, powered by the battery 34, monitoring and directing the activities of the system including the activities of the water conversion unit 18.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, paragraph 6. In particular, the use of "step of" in the claims herein is not intended to invoke the provisions of 35 U.S.C. § 112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. An improved water fueled engine comprising;
    a. a primary water storage means for storing a quantity of water
    b. a water treatment means, including filtration means for conditioning the water;
    c. a secondary water storage means for containing conditioned water and hot water returned by the system;
    d. a water conversion means for cracking water into hydrogen and oxygen gases;
    e. a control means, including a battery powered control means, for regulating the rate of cracking;
    f. a primary combustion means, including any combustion engine producing sufficient heat and vacuum pressure, that receives hydrogen from the conversion means, and atmospheric air as an oxidizing agent for combustion, wherein combustion energy drives a power shaft to do work;
    g. a heat exchange means for cooling the engine means and heating water in the secondary storage means;
    h. a secondary combustion means for receiving atmospheric air, oxygen from the cracking step and exhaust from the first combustion means for re-combustion and energy harnessing;
    i. a turbine generating means for exhausting waste gasses and charging the control means, including the control means battery.

2. The engine of claim 1, wherein the water is heated by waste heat from the primary combustion means.

3. The engine of claim 2, wherein the water is heated to a temperature over 200 degrees Fahrenheit.

4. The engine of claim 1, wherein the intake manifold of the primary combustion means maintains a vacuum pressure of more than 0.6772 bar (20 inches of mercury).

5. The engine of claim 1, wherein the control means controls magnetic fields in the conversion means to add separation energy to the molecular bonds between the hydrogen and oxygen atoms.

6. The engine of claim 1, wherein the conversion means further comprises magnetic catalyst cathodes and magnetic catalyst anodes for catalyzed electrolysis.

7. The engine of claim 1, wherein the conversion means accomplishes electrolysis using small amounts of electrical energy.

8. The engine of claim 1, wherein vessel pressure moves the hydrogen gas from the conversion means to the primary combustion chamber, and oxygen gas to the secondary combustion chamber.

9. The engine of claim 1, wherein an electric heater is used to heat the water until the engine is sufficiently warmed up.

10. The engine of claim 1, wherein an amount of hydrogen and oxygen is stored under pressure for use as the engine is warming up.

11. The engine of claim 10, wherein the hydrogen and oxygen is stored at a minimum of 100 psi.

12. The engine of claim 10, wherein a 100 psi hydrogen tank, with sufficient volume and pressure to supply hydrogen to the first combustion means for a minimum of two minutes without recharge, and a means of recharging the tank, once the engine begins to produce hydrogen from the conversion means.

13. The engine of claim 1, wherein a buffer tank of hydrogen generated by the conversion means is maintained during operation to ensure the supply of fuel to the primary combustion means.

14. The engine of claim 1, wherein the conversion means supplies 100 percent of the hydrogen to the primary combustion means, and the generating means receives 100 percent of its energy from electricity generated by the second combustion means.

15. The engine of claim 1, wherein the secondary combustion means comprises a chamber further comprising a combination of hydrogen oxidizing catalyst and carbon oxidizing catalyst sufficient to cause re-combustion of the constituents from the exhaust of the primary combustion means, when combined with oxygen from the conversion means and atmospheric gasses containing carbon.

16. The engine of claim 1, wherein the primary combustion means comprises a four-stroke or "Otto cycle" engine.

17. The engine of claim 16, wherein the vacuum is created by each down stroke and the engine compression ratio is at 12:1.

18. The engine of claim 16, wherein waste heat is contained in a water cooling means, including a standard automobile radiator.

19. The engine of claim 16, wherein a compressor is not required to move the exhaust gasses of the primary combustion chamber to the secondary combustion chamber.

20. The engine of claim 1, wherein the air to fuel ratios are controlled from ten percent to seventy percent of combustion chamber volume.

21. The engine of claim 1, wherein the primary storage means comprises a tank holding at least 15 gallons, and further incorporating a water level detection means.

22. The engine of claim 1, wherein the water treatment means comprises a filter, de-ionizer and water quality sensor.

23. The engine of claim 1, wherein until the engine reaches an operational temperature where sufficiently heated water is available from the secondary water storage means, water passes through an electric water heater to reach the water conversion means rather than through the hot water fuel tank.

24. The engine of claim 1, wherein the turbine generating means spins at less than 100K RPM to power an alternator.

* * * * *